Sept. 16, 1930.  W. H. BONE, JR  1,775,629
TIRE ALARM SWITCH
Original Filed June 24, 1927
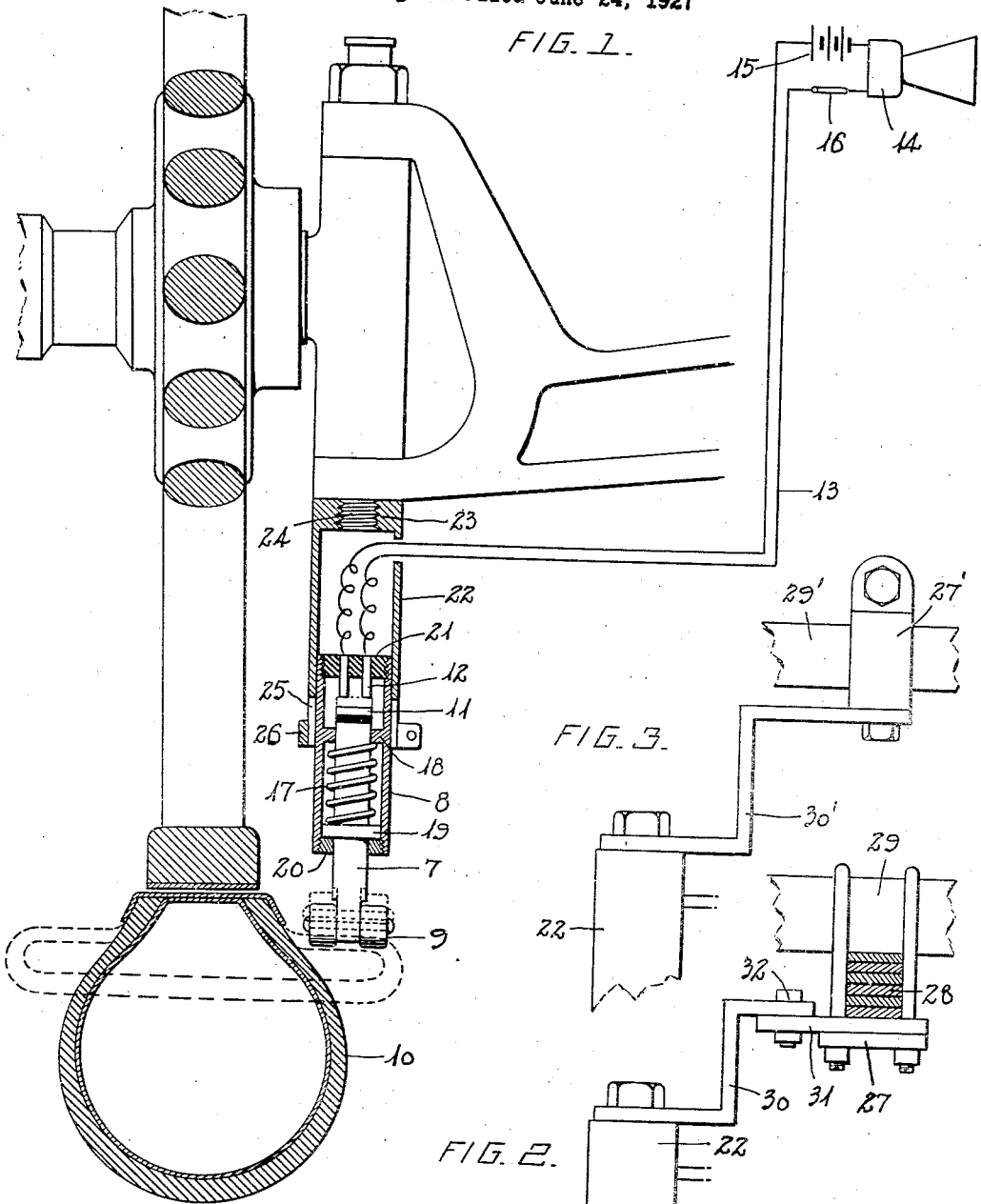

Patented Sept. 16, 1930

1,775,629

UNITED STATES PATENT OFFICE.

WILLIAM HENRY BONE, JR., OF DOUGLAS, GEORGIA

TIRE-ALARM SWITCH

Application filed June 24, 1927, Serial No. 201,212. Renewed July 9, 1930.

The present invention relates to tire alarms, and aims to provide a novel and improved device for giving an alarm when the tire of an automobile or other vehicle becomes deflated.

Another object of the invention is the provision of a simple, practical and efficient device of that kind which may be readily attached to the axle adjacent to the wheel.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a sectional view of the device as applied to the king pin of one of the front wheels of a motor vehicle, portions being shown in elevation and the electrical circuit being shown diagrammatically.

Figs. 2 and 3 are elevations showing other means for supporting the device from axles of different vehicles.

In carrying out the invention there is provided a vertical plunger 7 slidable vertically within a tubular guide 8, and having rollers 9 at its lower end so positioned as not to contact with the tire 10 when same is inflated, as seen in full lines in Fig. 1, and to bear on and be lifted by the tire when same is flattened, as seen in dotted lines. The plunger 7 has a switch plate 11 at its upper end adapted to bridge a pair of contacts 12 when the plunger 7 is raised, so as to close an electrical circuit 13 including an electric horn or other audible signal device 14, and battery 15 or other source of electrical current. The circuit also includes a switch 16 in order that the device 14 may be cut out, such as when the vehicle is not in use.

A coiled spring 17 surrounds the plunger 7 within the guide 8 and is confined between a shoulder or collar 18 in the guide through which the plunger slides and a collar 19 on the plunger, so as to yieldingly depress the plunger and remove the switch plate 11 from the contacts 12. A bushing 20 is threaded within the lower end of the guide 8 to support the collar 19 and plunger 7 and to also guide said plunger. The contacts 12 are carried by a bushing or plug 21 secured within the upper end of the guide 8.

The guide 8 is mounted for vertical and rotary adjustment, and for this purpose is telescoped within a depending tubular socket member 22 which has the nut portion 23 at its upper end to screw on the lower terminal of the king bolt or pin 24 which connects the front wheel with the front axle. Thus, the socket member 22 may replace the nut which is usually employed on the lower end of the king pin. The lower end of the member 22 is split, as at 25, and has a clamp 26 thereon to cause the lower end of said member to embrace the guide 8 when said guide has been adjusted so as to properly position the plunger 7.

Fig. 2 illustrates a clamp 27 which fastens a laminated leaf spring 28 with an axle 29, with the socket member 22 suspended from the bracket 30 that overlaps a plate 31 held by the clamp 27, a bolt 32 clamping the bracket on said plate and providing for adjustment of the bracket. As shown, the bracket is offset to accommodate the brake drum of a front or rear axle.

Fig. 3 illustrates a bracket 30' carrying the socket member 22 and attached to a clamp 27' which is adjustable on the axle 29', the bracket 30' as shown being offset so as to accommodate the brake drum of a front or rear wheel. The term "deflated" as used herein is meant to include partial as well as complete deflation, when the partial deflation is sufficient to operate the plunger 7.

Having thus described the invention, what is claimed as new is:—

A circuit closing device of the kind described comprising a vertical socket member having a threaded aperture at its upper end and having its lower end split, a clamp embracing the lower end portion of said member to contract it, a guide fitted in the lower end portion of the socket member for vertical adjustment, a bushing removably secured in the lower end portion of the guide, a plunger slidable in said bushing and having a collar seatable on said bushing, spring means within the guide for depressing said plunger, and insulated cooperable contacts carried by said guide and plunger.

In testimony whereof I hereunto affix my signature.

WILLIAM HENRY BONE, Jr.